United States Patent

Luckenbaugh

[11] Patent Number: 5,991,877
[45] Date of Patent: Nov. 23, 1999

[54] OBJECT-ORIENTED TRUSTED APPLICATION FRAMEWORK

[75] Inventor: Gary L. Luckenbaugh, Gaithersburg, Md.

[73] Assignee: Lockheed Martin Corporation, Bethesda, Md.

[21] Appl. No.: 08/834,784

[22] Filed: Apr. 3, 1997

[51] Int. Cl.$^6$ .................................................. G06F 12/00
[52] U.S. Cl. ............................................. 713/200; 707/5
[58] Field of Search ..................... 395/186, 600, 395/700, 726, 187.01, 188.01, 614, 701, 601, 54, 683; 380/25, 4, 9, 23; 707/9, 10, 103, 1, 5, 7; 713/200, 187.01; 364/286.4

[56] References Cited

U.S. PATENT DOCUMENTS

| | | | |
|---|---|---|---|
| 5,560,005 | 9/1996 | Hoover et al. | 395/600 |
| 5,680,452 | 10/1997 | Shanton | 380/4 |
| 5,682,535 | 10/1997 | Knudsen | 395/701 |
| 5,689,700 | 11/1997 | Miller et al. | 395/610 |
| 5,717,755 | 2/1998 | Shanton | 380/25 |
| 5,720,033 | 2/1998 | Deo | 395/186 |
| 5,781,633 | 7/1998 | Tribble et al. | 380/25 |
| 5,787,427 | 7/1998 | Benantar et al. | 707/9 |
| 5,787,438 | 7/1998 | Cink et al. | 707/103 |
| 5,826,268 | 10/1998 | Schaefer et al. | 707/9 |

Primary Examiner—Robert W. Beausoliel, Jr.
Assistant Examiner—Nadeem Iqbal
Attorney, Agent, or Firm—Whitham, Curtis & Whitham

[57] ABSTRACT

An object-oriented framework provides ease of development and alteration of access control systems for arbitrary applications and accomodates arbitrary security policies while providing fine-grained security by providing for creation of labels for portions of a resource such as an application or portions of files, credentials corresponding to users and any other objects of the access control system by providing templates for such objects within at least one policy manager class of objects and which can be selected or modified at will. Provision for creation of label and credential objects which are later compared or correlated for granting or denying access to portions of a resource effectively decouples security policy from security enforcement and allows reconciliation of security policies having inconsistent requirements as well as development of hybrid and customized security policies.

6 Claims, 4 Drawing Sheets

OBJECT-ORIENTED TRUSTED APPLICATION FRAMEWORK

BACKGROUND OF THE INVENTION

1. Field of the Invention

The present invention generally relates to provision of security and access authorization checking in computer systems and, more particularly, to the provision of security and limitation of access to data and facilities of data processing and network service applications such as interactive user programs, routing applications and data storage applications.

2. Description of the Prior Art

Data processors have proliferated in recent years as their capabilities and economic accessibility have increased. At the same time, the demand for applications programs to increase those capabilities and to exploit increased available processing power of processors for an increasingly wider range of uses has resulted in a similar proliferation in applications programs. Recent advances in interconnectivity have allowed sharing of both hardware (e.g. printers and memory, including distributed file systems) and software (e.g. data and applications) resources between processors over a network. Because of interconnectivity of processors and sharing or distribution of resources, physical security of a particular processor which is interconnected with any other processor provides little security for data or applications thereon.

Historically, information security has been addressed at the operating system and network levels; tending to locate computer security into a small kernel at the lowest level of the operating system and network protocols in an effort to minimize the amount of security-related code required. However, such an approach imposes security constraints onto otherwise untrusted applications and is inflexible and not easily adapted to differing security requirements such as differentiating levels of authorization for different categories of users.

To obtain greater flexibility where desired, current access authorization arrangements have generally been applied at the application program level or, for networks, at the "middleware" level (services located above network protocols but below applications). However, middleware level system security assumes a discrete and integral network for application of a singular security system under the control of a system administrator (but which does not preclude provision of further security at the data, file or application level). Application level security and security for data which may be controlled under that application (e.g. so-called fine grain labelling at the level of a file or specific information such as a sentence, paragraph or particular numerical data within a file) is generally implemented in a manner which is specific, if not unique, to each application.

The addition of programming to implement application level or middleware security may comprise a significant fraction of the software of the application or middleware and is time-consuming and therefore expensive to develop. Further, since it is desirable that different applications be able to access and process information from other applications (at least to avoid the need for additional data entry or manual control of data transfer), issues of compatibility of security arrangements (e.g. logon or identification format which vary widely between known security arrangements) must be assured. Further, if data is duplicated for processing by different applications, issues of data integrity can arise since data could be updated in one application while obsolete data remained available from another.

Additionally, in data processing systems capable of handling large databases and storage of large numbers of files which are accessed by a large population of users, it is common to provide or limit access to documents or files by category of document or portion thereof in a hierarchy of access levels (e.g. "top secret" "secret", "confidential" and the like) and to similarly categorize users by access rights in accordance with corresponding hierarchical levels of access authorization or clearance, referred to as classification-based policies. Such systems are generally used by the military.

It is also common to limit access by information content category (e.g. confidential, internal use only, proprietary technical information, personal and the like) and to limit access based on some activity, employment or need-to-know based criteria (e.g. system administrator, managers, engineers, programmers and the like), which are referred to as role-based policies. Classification-based policies (and, in general, role-based policies) are collectively referred to as multi-level security or mandatory access control (MAC) policies.

Alternatively, storage can be partitioned (e.g. into mini-disks, virtual partitions or the like) and access to partitions and groups of partitions granted to individual users or groups of users (e.g. by use of aliases) in accordance with access lists or similar mechanisms, referred to collectively as discretionary access control (DAC) policies. Role-based policies may also be implemented by partitioning in a DAC manner based on mini-disks, subject matter categories or the like. However, mandatory and discretionary access control policies are not easily reconciled or hybridized to provide a mixture of functions and, while they can be used together by requiring that access be granted under each system individually, only one or the other is usually provided and then rigidly enforced across all applications. That is, the security policy and the enforcement policy are generally bound together. Further, discretionary access control arrangements based on virtual partitions of storage is generally incompatible with fine-grained security.

Accordingly, so-called trusted applications have been developed to provide fine-grained security as well as by categories of documents and users and partitioned storage access authorizations, as may be desired, in applications and network services. A trusted application is an application which supports the labelling of specific data (e.g. a file or portion of text or range of data within the file consistent with requirements for fine-grained security) with security attributes (e.g. "secret", "confidential", "internal use only", "personal" and the like) and can support enforcement of desired security policies (e.g. MAC, DAC, role-based policies and the like). The term "trusted applications", for purposes of this disclosure, will be considered to also include trusted network and application services having similar capabilities in regard to network communications, routing, shared resources and the like.

Heretofore, trusted applications were developed for specific customers with specific security policies which might differ between applications. Therefore, to accommodate a wide variety of security policies there was little opportunity to re-use existing software in new environments even though trusted applications may have been costly to produce. Accordingly, each new trusted application has required a significant investment in time and cost to implement desired security arrangements and there has been virtually no assurance of compatibility of security arrangements between applications.

In summary, there has been no system which provides separation of security policy from security enforcement together with fine-grained securing of objects and access control except by customized, application-specific, programming which largely precludes re-use of code in development of new applications. Further, in general, discretionary access control systems and mandatory access control arrangements, while usable together, cannot be reconciled and, once established for an application or system, neither can be modified or tailored to meet the requirements of the other without rewriting substantial amounts of code which may be distributed throughout the application.

So-called object oriented programming has become known in recent years. Object oriented programming is not so much a new form of programming or language (although some new programming languages and modifications of existing languages have been introduced to facilitate it) as it is a new, modular view of the construction or architecture of programs in which the system embodied by the program is decomposed into a collection of communicating objects.

Key concepts in object oriented programming which are of importance to the present invention are encapsulation, classification and inheritance. Encapsulation reflects hiding of the internal mechanisms of an object from the users (which may be other objects) of an object as well as other parts of the system to avoid the need for system-wide changes when any object is modified. Classification characterizes the behavior of a set of objects. Inheritance is a property which allows an object or a class of objects to extend (or, conversely, specialize) the behavior of an existing class of objects. Classes of objects are arranged into a hierarchy wherein a class lower in the hierarchy inherits the interface and behavior of its parent class. Conversely, a higher class is a generalization of its descendants, both as to the characteristics and behaviors or methodologies they embody.

In the object oriented approach, a distinction is made between abstract and concrete classes of objects. A concrete class can instantiate objects (e.g. objects are instances of members of a concrete class) whereas an abstract class is a generalization insufficiently specific to support object instances. For example, in the hierarchy vehicle-car-sedan, a class "car" is a generalization of all models of cars and thus the class "car" which represents mutually exclusive models of cars (e.g. coupes, roadsters, sedans, station wagons) as subclass instances but specific cars cannot be instantiated (since mutual exclusivity prevents generalization of attributes which are significant to the decomposition). However, a subclass "sedans" inherits behavior of parent class "car" and its parent class, "vehicle", and supports instances of specific models of "cars" which are "sedans". More generally, in a hierarchical tree structure, internal nodes of the tree would usually be abstract classes and "leaf nodes" would be concrete classes. Due to inheritance, abstract classes may be viewed as templates for concrete classes.

An object oriented framework comprises a class library containing both abstract and concrete classes. The core of a framework is a set of abstract classes that define a general set of concepts. The framework thus comprises high-level abstractions that are refined in further abstract and concrete classes through inheritance. The concept of an object oriented framework and the library it embodies is in marked contrast to traditional program libraries which contain more or less generalized low-level modules which are called by application programs. Thus, the primary virtue of object oriented program design is that it permits maximum re-use of existing code and data, through inheritance and encapsulation, and allows the programmer to develop routines by developing abstract and concrete subclasses based on the concepts and behaviors (e.g. default methods) embodied in abstract classes organized in the framework to support specific desired behaviors or implement specific desired policies for operation of the system.

A further important benefit of an object oriented framework is that the programmer often may not need particular expertise in regard to the functions to which the framework is directed since, to a greater or lesser degree, that expertise is embodied in the framework itself. The developer then need only develop objects specific to the application to be controlled by the framework and which will inherit properties and behaviors of classes within the framework. The inherited properties and behaviors thus need not be defined, formulated or implemented by the developer but only selected by development of application-specific objects to inherit the desired properties and behaviors.

By the same token, however, development of a framework is by no means trivial since the definition of classes and subclasses and their organization (e.g. by definition of attributes and relationships, sometimes referred to as "has" and "uses" relationships) must embody particular expertise to the same degree that a subsequent program developer using the framework can be relieved of it. Additionally, the definition of the hierarchy of classes and subclasses and the articulation of the framework must accommodate abstract classes comprehending all potential variations and specific behaviors which can be produced therefrom (e.g. inherited by instantiated objects).

Further, object oriented programming does not, in and of itself, reconcile conflicting requirements of behavior of systems. On the contrary, the hierarchical nature of a framework or any object oriented program design theoretically implies that generalization must be possible. Where severe conflicts and mutual exclusivities exist, the essential potential for generalization is usually lacking. Therefore, the ability to impose fine-grained labelling together with mandatory or discretionary access control must generally be custom built for each application.

SUMMARY OF THE INVENTION

It is therefore an object of the present invention to provide a an object oriented framework to allow substantial re-use of code by developers of new trusted applications.

It is another object of the invention to provide an object oriented framework which will contain a substantial body of security system expertise complementary to the level of security system expertise of application developers.

It is a further object of the invention to provide a generalized framework which provides separation of security policy from security enforcement and supports fine-grained labelling and access control in a manner compatible with virtual partitioning of storage.

It is yet another object of the invention to provide an object oriented security framework that embodies the core concepts of all trusted applications.

In order to accomplish these and other objects of the invention, a data processing system including an access control system for controlling access to portions of a resource and capable of running an application is provided in which the access control system includes a trusted framework including a credential class and a label class of objects, and a policy manager including a policy manager class of objects for creating label objects for portions of the resource and credential objects corresponding to users of the data processing system and instantiating the label objects and credential objects in a respective label class or credential class, and an arrangement for comparing a credential object created by the policy manager with a label object created by the policy manager for operation of the access control system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
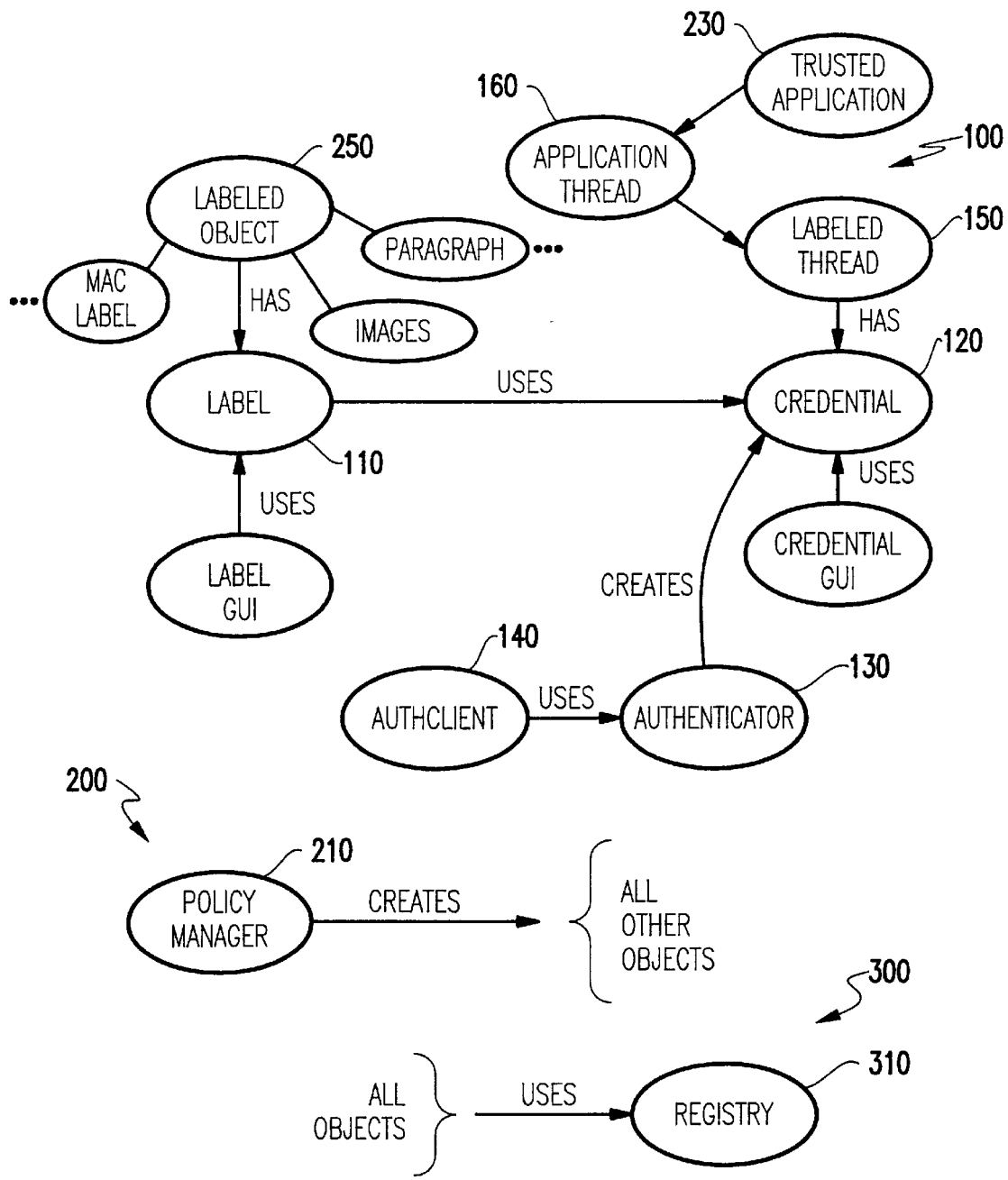
FIG. 1 is a block diagram in the nature of a Booch diagram of the attributes and relationships of the primary or basic classes of the framework in accordance with the invention.

Referring now to the drawings, and more particularly to FIG. 1, there is shown a Booch diagram of the attributes and relationships of the primary classes of a preferred object oriented framework 100 in accordance with the invention. It should be understood that "attributes" generally corresponds to information (e.g. properties and methods) which are contained in objects of a class including generalizations of subclasses and where the subclasses may contain a portion or the entirety of such information (e.g. "downward looking" in the framework hierarchy). Conversely, "relationships" generally corresponds to "uses", referring to classes of objects which may invoke objects or provide inherited properties or methods (e.g. "upward looking" in the hierarchy of the framework).

It should also be understood that the specific names of classes, as depicted, are irrelevant to the practice of the invention and are adopted only as a convention to identify respective classes in a manner which can be readily assimilated. However, consistency of use of class and object nomenclature should, of course, be maintained in a consistent manner throughout any implementation of a framework in accordance with the practice of the invention.

Additionally, an abstract or concrete class may possess one or more methodologies by which one or more classes or objects of another abstract or concrete class may be created or modified. Such a procedure is particularly useful where a subclass may contain objects of which generalizations are not initially known. Therefore, a "creates" link between classes is a relationship and generally considered to be upward looking in the object oriented framework hierarchy.

It should be understood, however, that the "creates" relationship, as referred to in this description of the invention, depending on the particular implementation or how the relationship is viewed, may include bidirectional communication or sharing of contents of the "creating" and "created" classes. That is, the methods of the "creating" class, either directly possessed or as overridden by methods of subclasses of the "creating" class, may be viewed as methods of the "created" class. Conversely, such methods of the "creating" class may be considered as polymorphic procedures. That is, when an object of the "created" class is initialized, an appropriate procedure is sent to the created object from the creating class and thereafter remains as an integral part of the of the created object of the created class. The "create" relationship appears at several points of the framework in accordance with the invention and is important to the functionalities thus achieved.

While these different views or other views of the "creates" relationship would be represented by distinct implementations, which will be evident to those skilled in the art in view of the description herein, the particular view or implementation is not otherwise important to the practice of the invention so long as the ultimate function is achieved. The property of encapsulation hides or renders transparent to a user the internal workings of the class or object and once implemented, the details of the methodology are of no further importance.

Figure 3:
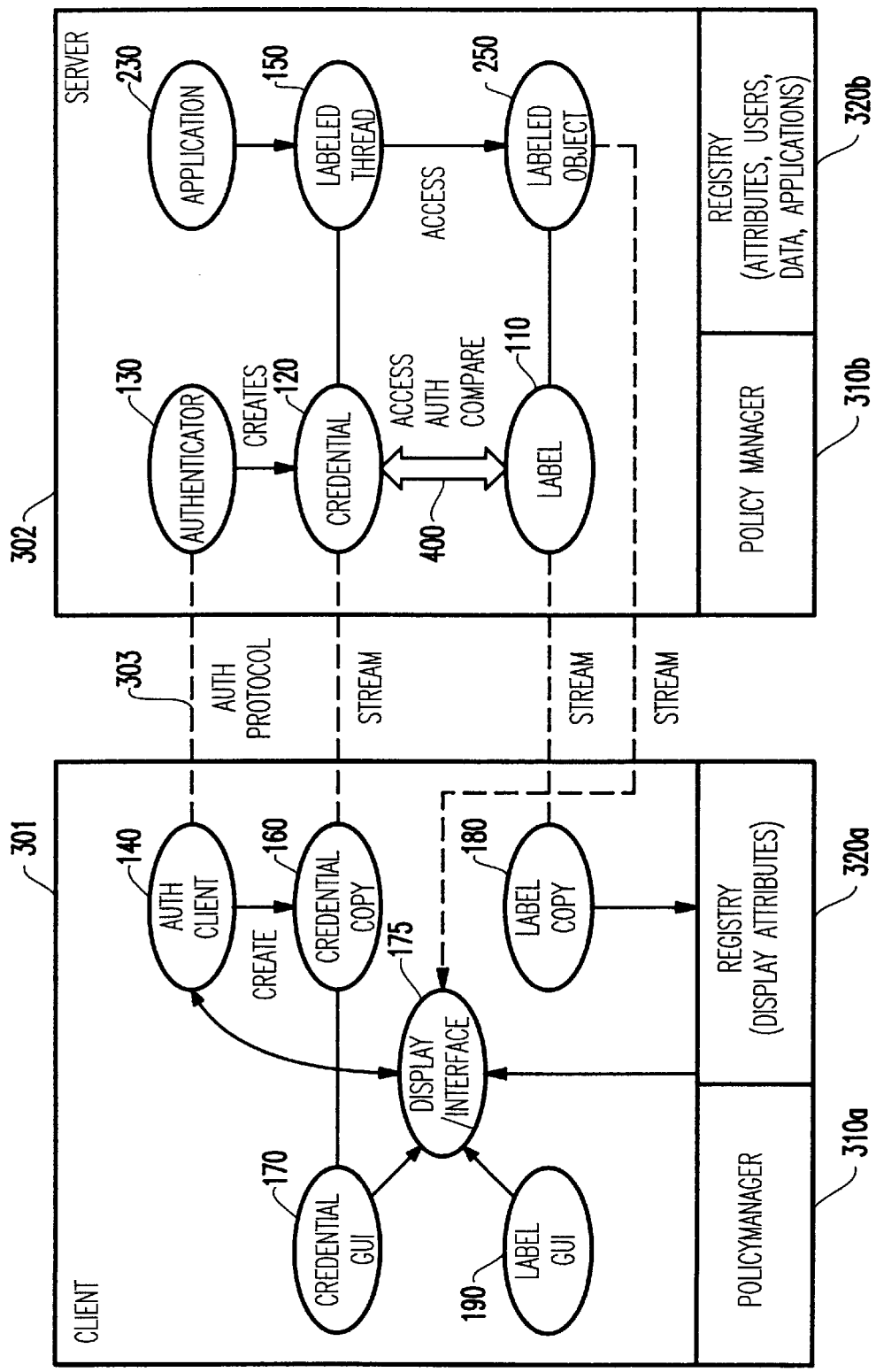
FIG. 3 shows the classes depicted in FIG. 1 in a preferred allocation between a client and a server of a network.

The central classes in the object oriented framework in accordance with the invention are the label class 110, the credential class 120 and the authenticator class 130. In a network environment, these classes are preferably implemented on a server 302, as shown in FIG. 3, since a server is considered to be trusted, having hardware and software provisions for protection of the data and programs that it "owns" or contains. Further, security policies are preferably enforced by the server 302. In contrast, a client processor 301 is not necessarily trusted since it cannot generally protect the integrity of non-resident data and may be physically unsecured in regard to potential unauthorized users or persons seeking to compromise system security.

Additionally, it should be noted from FIG. 1 that the framework includes two sections 200, 300 which include the policy manager 210 and registry 310, respectively. These classes interact with the remainder of FIG. 1 by providing utilities by which creation or tracking of objects/instances and/or concrete subclasses may be facilitated. Therefore, in FIG. 1, sections 200, 300 are not depicted as connected to the remainder of the framework but the functional interaction is illustrated in FIGS. 2 and 3.

Figure 2:
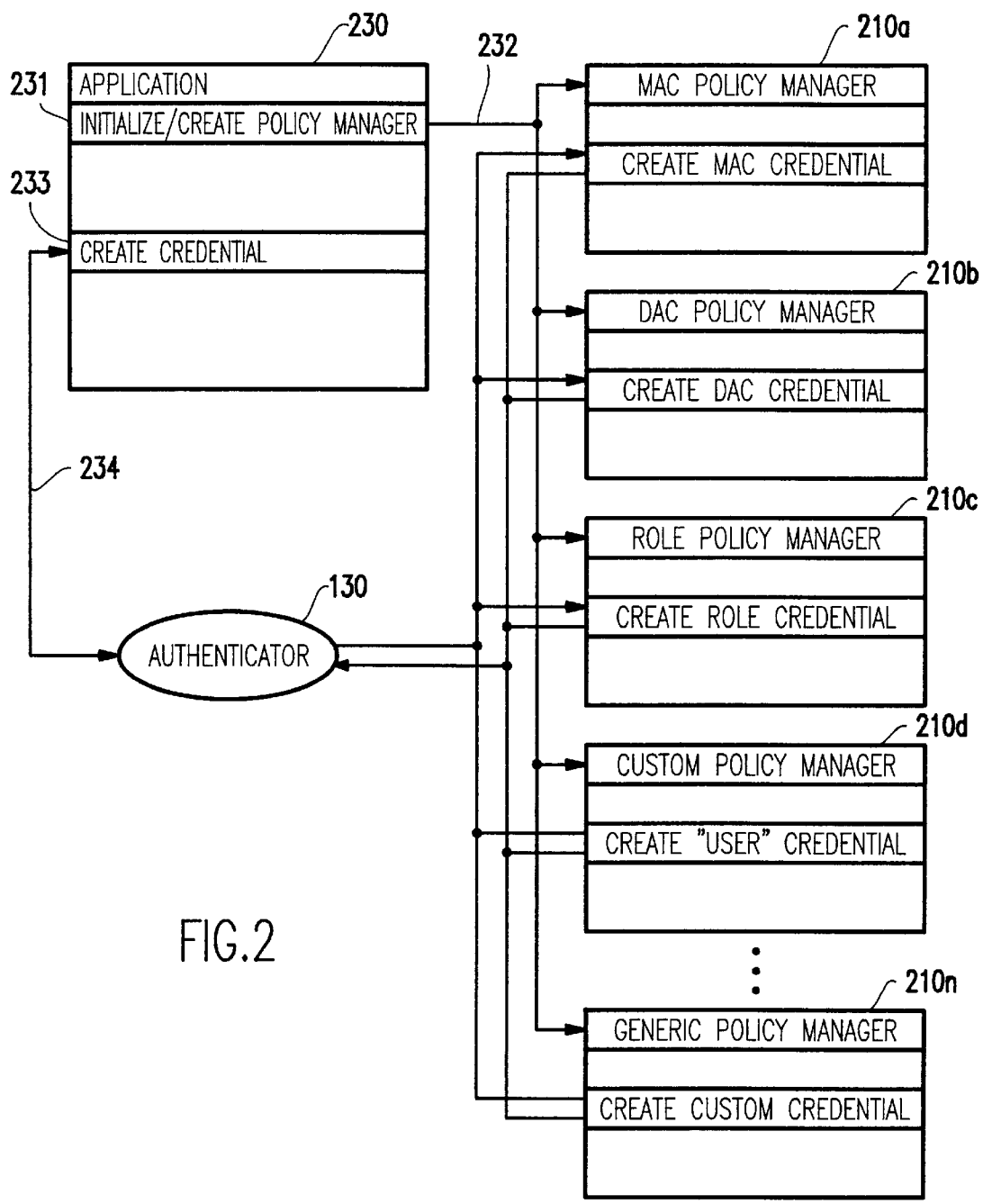
FIG. 2 illustrates the functional relationships between objects also depicted in FIG. 1 as implemented with a processor.

Specifically, with reference to FIG. 2, the policy manager 210 provides a set of creation methods (e.g. templates) for creation of basic types of concrete subclasses. For example, if the client 301 needs to construct a credential, it may call PolicyManager.CreateCredential( ) which returns an appropriate specific credential object for the current or application-implemented security policy, such as a MACCredential( ) which is a subclass of the abstract credential class. (The notation "( )" throughout the following discussion indicates that no argument is necessary for the function or procedure since the functions or procedures so indicated are members of an object and the particular information on which the function or procedure is performed which would otherwise be stated in the argument is implicit in the object, itself.)

The registry 310 maintains any security attribute information required by other objects of the framework (which thus "uses" it). For example, it can store information about various forms of labels (e.g. internal versus external, short versus long forms and information about rendering labels and labelled text, such as display attributes). Since the framework is preferably written in the Java™ language, registry 310 is preferably implemented as a subclass of the Java Properties class.

It should be further noted from FIG. 3 that the policy manager 210 and registry 310 are preferably provided on both the client 301 and server 302 processors of a data processing system 1000 although both have somewhat different functions in those respective environments. (In this regard, the client and server are functionally differentiated by ownership of the resource (server) and interface with the user (client) although both could be implemented on the same machine and need not be spatially separated. By the same token, since the objects illustrated in FIGS. 1–3 are preferably implemented by one or more special purpose processor(s) or one or more suitably programmed general purpose processor(s), the objects may be understood as discrete functional entities implemented in the hardware such as logic, memory, etc. of the processor and allocated to the object when and as an object is called. The decomposition of the framework into objects thus effectively provides a plurality of specialized processing entities communicating with each other in a network to accomplish the overall task.) The registry 320a used on the client 301 side controls streaming of information from the server 302 and contains display attributes for association with labels corresponding to that information whereas the registry 320b on the server 302 side, functions as a database for all security attributes such as data pertaining to information, users, data, applications and hardware to return selected data from a disk or the like. Similarly, the policy manager 310a of the client 301 must issue the appropriate call through an AuthClient object 140 to invoke an appropriate return by the interaction of an authenticator object 130 and the policy manager 310b of the server 302, as will now be discussed with reference to FIG. 2.

It should be noted from FIG. 2 that while a plurality of policy managers 210a–210n are depicted, only one of 210a–210d will generally exist on a developed application (although this is somewhat a matter of specific implementation and conceptual definition since any policy manager such as custom policy manager 210d can be a hybrid of any two or more other policy managers or independently developed for any arbitrary security policy) and called to be created during initialization of the developed application. On the other hand, an embodiment of the invention intended for use as an application development tool will contain an array of such policy managers, a selected one of which is preferably initialized during opening of the development tool application.

For purposes of this description of the invention, both the developed application and the development tool application are denoted by reference numeral 230 and initialization in accordance with either type of function is indicated in the alternative at 231 since, in either case, one of the policy managers 210a–210n will be activated (as indicated at 232) and used during that particular session of the application. It should be noted that, particularly as implemented in an application development tool embodiment, generic policy manager 210n is preferably a default policy code format which can be run but the primary function of which is to be modified into a custom policy manager which becomes, upon storage in another file (preserving the generic format of 210n), a counterpart of custom policy manager 210d.

It was pointed out above, that policy manager 210 creates all other objects. To perform such a function, the policy manager contains templates in a code format resembling CreateCredential( )=MACCredential( ) so that when "CreateCredential( )" is received, a "MACCredential( )" object will be returned. Appropriateness of the request is preferably, for convenience, determined by interaction of the credential object 120 and the label object 110 at the server 302 in accordance with the authorization of the current user to permit or prevent the transaction.

This communication to create an object is preferably accomplished from the application 230 (embodied on the client at any given time as a thread 160 to which, as a labelled thread 150, access has previously been granted) through an arbitrary password protocol 303 between an object of the AuthClient class 140 and an object of the Authenticator class 130, shown in FIGS. 1 and 3. All other objects are created in substantially the same manner, as needed, through the return provided by the policy manager 210. Therefore, adoption or customization of a particular policy manager 210 for the framework of the invention is sufficient to provide whatever security arrangement is desired in an application and thus form a trusted application. All other objects which are not created by the policy manager in the above-described manner and which may be needed are provided as part of the framework in accordance with the invention and installed in the application in a modular fashion as will now be described with reference to FIGS. 4–10 which depict an exemplary subclassing of the abstract classes illustrated in FIGS. 1–3.

Figure 4:
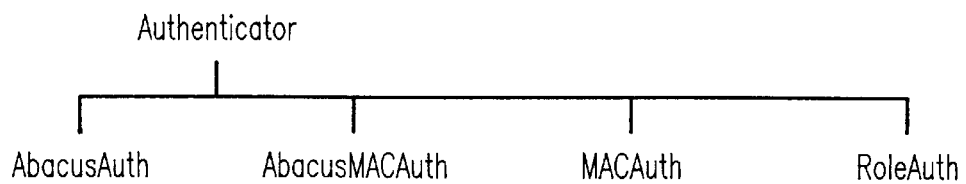
FIGS. 4, 5, 6, 7, 8, 9 and 10 illustrate subclassing of the classes depicted in FIGS. 1, 2 and 3 in accordance with a preferred form of the invention.
Figure 5:
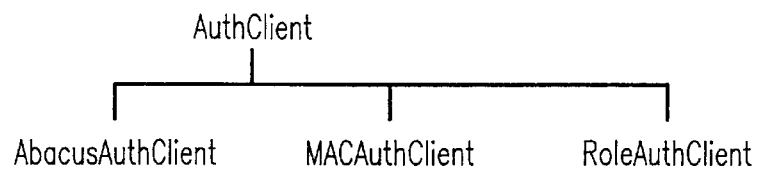

Referring first to FIGS. 4 and 5, the instances (or objects) of the AuthClient 140 and the Authenticator 130 classes are arranged to conduct an arbitrary authentication protocol between the client and server as depicted at 303 of FIG. 3. This protocol can range from simple transmission of a name and password (or name, password and clearance for a MAC policy) to a highly complex authentication protocol such as that known as a Kerberos authentication. Thus, as shown in FIG. 5, instances of the AuthClient class 140 contains objects which preferably provide an interface, such as a pop-up dialog box on a display, to collect information concerning the client which are needed for particular authorization policies. Exemplary objects "Abacus AuthClient", "MACAuthClient" and "RoleAuthClient" are illustrated for collection of information which may be needed for a proprietary or custom policy and generic MAC and role policies, respectively. Any number of additional interfaces to accommodate other existing or custom authorization protocols can be provided, as will be evident to those skilled in the art in view of this discussion.

Such an interface can include provision for entry of a number from a so-called SecurID (a trademark of Secure Dynamics, Inc.) system or collection of physiological information such as voice recognition or physiometric data, as desired. Necessary data may have been previously collected (e.g. during logon of a user at the client) and retrieved from a cache, as would be the case for a Kerberos authentication procedure.

In any case, each object or instance of the AuthClient class (which may themselves be objects subclassed under each respective objects or polyinstantiated for each object of the AuthClient class) provides at least three operations or methods. These operations are:

AuthClient(socket s) which creates a client side authentication object to use socket s;

Credential doAuth( ) which calls the credential object through the authenticator to prompt the user for the user's credentials (which may be null) on the server, conducts an authentication protocol with the server; and, as a concluding procedure, to call Credential recvcred( ) which carries out reception of credentials (e.g. the needed identification information) from the server.

Correspondingly, as shown in FIG. 4, the Authenticator class 130 will contain objects to carry out the authentication protocol on the server 302 side with an object of the AuthClient class 140 and communicate with the credential class 120 in correspondence with the operations of a particular AuthClient object. For example, AbacusAuth, AbacusMACAuth, MacAuth and RoleAuth objects are provided to correspond to DAC and MAC policies under Abacus and generic MAC and role policies, respectively.

The operations or methods provided for each of these Authenticator objects are:

Authenticator(socket s) which creates a server side authenticator object for socket s;

Credential doAuth( ) which carries out the corresponding operation called by an AuthClient object to authenticate the entity on the client side and return a credential object from credential class 120 representing a user or null; by calling boolean sendCred(credential c) which streams a copy of credential c to the client to instantiate credential c as an object of the credential copy class 120'. Thus AuthClient.doAuth( ) and Authenticator.doAuth( ) embody the authorization protocol and can use GSSAPI or other services known to those skilled in the art.

Figure 6:
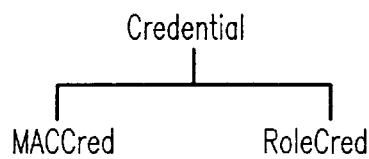

Objects of the credential class 120 shown in FIG. 6 principally control the accessing of registry 320*b* of the server 302 and transmission of a copy of credential information to the client and thus correspond to MAC and role-based policies since different types of information are used in each type of policy. Generally MACCred and RoleCred are sufficient but additional custom credential objects may be provided as desired. Operations or methods of all credential objects are:

Credential( ) which constructs an empty (default) credential;

String getprincipal( ) which accesses the registry 320*b* to return the principal ID associated with the credential of the user;

void setPrincipal (string p) which sets a principal ID associated with the credential in registry 320*b*;

boolean streamOut(Output stream f) which writes the current credential as an output stream to credential copy 120' of client 301;

boolean streamIn(Input stream f) which initializes the current credential from a stream of bytes read from an input stream from an object of credential copy class 120'; and boolean editCredentials(credential c) which edits a credential object by applying credential c to the credential accessed from registry 320*b* (i.e. the current credential) to control enforcement of the policy.

The collective function of an AuthClient object, an Authenticator object and a credential object thus allows an AuthClient object to control streaming of a credential to the credential copy class 120' at the client and presentation to the user through a display interface 175, preferably under control of a credential graphic user interface (GUI) 170.

The credential may be modified by the user, if allowed, and any change is preferably facilitated through the credential GUI 170 which may, for example, provide a pop-up dialog box by any technique, as alluded to above technique. The particulars of the credential GUI are unimportant to the practice of the invention. However, since a user may wish to access information or applications at a clearance level less that the maximum authorized for the user or under a particular role, for example, when other persons may be able to view the returned data on the display or other user interface, provision of a credential GUI in the form of a dialog box is much preferred.

Figure 8:
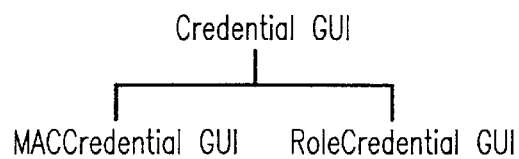
Figure 9:
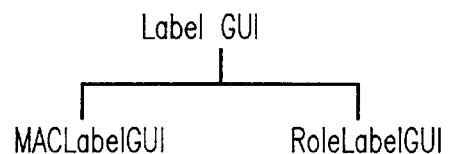
Figure 10:
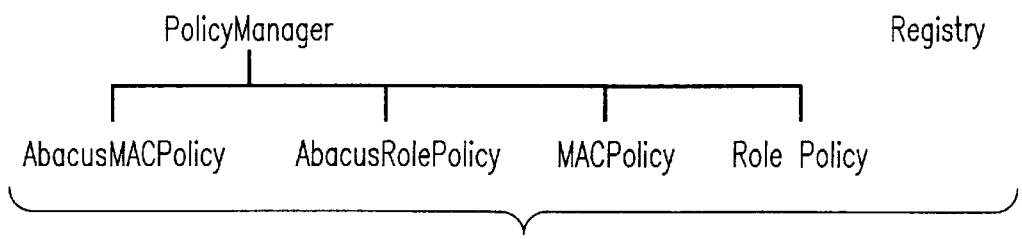

The particulars of the dialog box are likewise not at all critical to the practice of the invention but it is preferred to generate the dialog box as a polyinstantiated object (having, for each security policy, operations or methods to 1.) construct a GUI for credential c, 2.)set up a graphics context for rendering the credential and, if desired, 3.) to pop up a dialog box, menu or other interface) to minimize code and provide a consistent appearance for the exemplary MACCredential GUI and RoleCredential GUI objects as shown in FIG. 8 as well as for the objects instantiated under the Label GUI object as shown in FIG. 9.

It should be noted that the most basic function of the secure framework in accordance with the invention is the comparison or correlation of an object of credential class 120 with an object of the label class 110 which will have been attached to portions of data or applications to support the function of fine grained security of a trusted application. The particulars of the comparison or correlation operation are not critical to the practice of the invention and is depicted by a bidirectional arrow 400 in FIG. 3. As depicted in FIG. 1, however, it may be considered that a label object uses a credential object to grant access to an object of labelled object class 250 which may point to a labelled thread object of labelled thread class 260 which is, in turn, a portion of application 230. It is, however, preferred to use credentials as labels for labelled thread objects as will be discussed below to allow access to a thread based on a credential and to serially permit the thread so accessed to access the labelled object. Security is then enforced on the labelled object.

Figure 7:
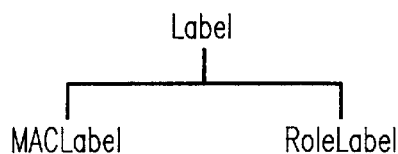

Similarly to objects in credential class 120, as illustrated in FIG. 6, label objects, as illustrated in FIG. 7, correspond to MAC and role-based policies although custom objects may be provided for other policies (e.g. hybrid policies, thus allowing some mixture of MAC and DAC functions to be provided). Exemplary MACLabel and RoleLabel objects are shown. Each of these objects provides the following operations or methods for manipulation of labels:

Label(credential c) which constructs a new label for user c;

Label(credential c, label l) constructs a new label for user c where the parent object has label l;

Label( ) which constructs and empty (default) label;

boolean accessCheck(string mode, credential c) which determines if the specified mode of access (e.g. read or write or additional application specific modes) is allowed for a user having credential c;

String toString(int type) which returns a printable string for the label where type =FULL or SHORT (note: the argument "int type" is an incident of the Java™ language in which the format type of the returned printable string is specified by an integer);

void fromString(String s) which sets the label to the value derived from the string;

boolean streamOut(output stream f) which sends the label as a stream to the server boolean streamIn(input stream f) which initializes the label as a stream of bytes from the server; and boolean editLabel(credential c, Label l) which applies label l to the current label as stored in the registry 320*b* using credential c to determine which attributes are allowed to change.

For consistency of appearance and minimization of code (if accommodated by the programming language), the label GUI contains objects which a polyinstantiated with the credential GUI for each security policy (e.g. MACLabelGUI and RoleLabelGUI, as shown in FIG. 9) and having the same operations or methods of 1.) construct a GUI for credential c, 2.)set up a graphics context for rendering the credential and, if desired, 3.) to pop up a dialog box, menu or other interface, as noted above. Editing of the label may be desired, for example, to change clearances or roles for which access may be granted as information is edited or to change display or interface attributes since an indication of security classification of portions of data, while often desirable and accommodated by the invention, may also convey information concerning the relative sensitivity of the data which the user may wish to suppress. The user's credential c is used to determine which attributes corresponding to the label which the user will be allowed to change.

Objects of the labelled object class 250 and the labelled thread class 150 are not critical to the practice of the invention. Exemplary subclasses of attributes by which labelled objects may be defined (e.g. paragraph, MACLabel, images) are shown in FIG. 1. However, for the labelled thread class 150 objects should provide methods to attach a label (e.g. a credential in the preferred embodiment of the invention) to a thread and to fetch the label of a particular thread. For the labelled object class 250 objects should provide operations or methods to output the object of a stream to persistent storage, receive the object as a stream from persistent storage, fetch the label of an object and set the label of an object. Since the number of labelled objects and threads may be very large, it is preferred to provide the operations or methods from registry 320b for all labelled threads and labelled objects. These respective sets of operations or methods will be consistent for all labelled objects and labelled threads in each respective class thereof and security to permit or prevent performance of the method or operation is preferably enforced based on the comparison or correlation 400 (FIG. 3) of the credential and the label, as described above.

As noted above, all other objects are created as needed by the policy manager 210 in response to calls from objects of abstract classes. For example, in the description of FIG. 2, an object of the authenticator class 130 calls for the creation of a credential which is carried out by the policy manager. The policy manager class provides a set of operations used to create the fundamental security objects provided by the framework. The purpose of the policy manager is to hide the details of the policy specific objects from the application program. For example, an application program does not need to know that a Label object is a MacLabel or a RoleLabel, and, in fact, it should be designed to be independent of the specific type of Label.

It is not possible for the application program to directly instantiate objects such as labels, credentials, authenticators, etc. since they are avstract classes and, at the same time, the application should not have knowledge of the policy specific classes such as MacLabel and RoleLabel which can be directly instantiated by the policy manager. As such, the policy manager class hides the instantiation of policy specific objects behind generic interfaces described below for creating Labels, Credentials, Authenticators, etc. From the perspective of the application, these interfaces provide the ability to create general Labels, Credentials, etc. but from the perspective of the policy manager, these interfaces are used to instantiate concrete classes such as RoleLabels and RoleCredentials depending on the policy that is being used.

To summarize the other objects which may be created by the policy manager in response to calls from objects of other abstract classes, the policy manager should preferably provide the following operations or methods:

Authenticator createAuthenticator(socket s) which creates a policy specific subclass of authenticator;

AuthClient createAuthClient(socket s) which creates a policy specific client side AuthClient object;

Label createLabel( ) which creates a policy specific subclass of Label which is in the default state;

Label createLabel(credential c) which creates a policy specific label derived from the user's credentials;

Label createLabel(credential c, label 1) which creates a policy specific label that is a function of the parent object's label and the user's credentials (which supports and facilitates fine grained labelling in a hierarchical manner);

Credential createCredential( ) which creates a policy specific subclass of credential;

Credential createCredential(inputStream f) which creates a credential from a serialized representation of the cresential;

LabelGUI createLabelGUI(label 1) which creates a policy specific label GUI; and

CredentialGUI createCredentialGUI(credential c) which creates a policy specific credential GUI.

These methods and operations are also preferably provided through registry 320b, particularly for embodiments of the invention used as an application development tool since many may be common to several policy managers 210a–210n and, in any case, provision of the methods or operations through the registry allows minimization and simplification of the code which must be written to customize the policy manager during development of a trusted application.

These methods and operations thus form a portion of a "toolbox" that preferably contains authentication protocols (of which the AuthClient and Authenticator objects form a part and are correspondingly created, including establishment of MAC credentials and clearances and other mechanisms such as SecureID, mentioned above, which it is desired that the trusted application employ), label and credential classes in the form of lists corresponding to respective security policies (and employed in the createLabel and createcredential methods, above, respectively), and definitions of labelled objects corresponding to fine grained labelling.

The framewoprk in accordance with the invention thus provides a set of abstract classes that model the fundamental concepts involved in developing trusted aplications with fine-grained security labelling and access control. In particular, the key concepts such as authentication, user credentials and object labelling are modeled by abstract classes that are independent of any particular security policy. This decomposition allows for the separation of security policy from security enforcement. The application decides when and where security must be enforced by making calls to abstract classes of the framework (i.e. Label, Credential, Authenticator, etc.). On the other hand, the concrete classes of the framework have all the knowledge of the security policy and hide this information from the application. This results in strict separation of policy and enforcement and also allows significantly different policies, such as such as role-based and MAC policies, to be treated in a uniform manner with a common interface.

In view of the foregoing, it is seen that the trusted framework in accordance with the invention provides a tool for the development of trusted applications which allows maximal re-use of code and embodies maximal security expertise so that any desired security policy and enforcement arrangements can be implemented by choice or customization of a policy manager class and, at most, development of a custom credential object and corresponding custom label object. Security enforcement is provided by comparison or correlation of credentials and labels for all purposes including editing of the labels and credentials and security enforcement is thus separated from the security policy by creation of policy specific label and credential objects (which may thus support fine grained security regardless of policy by virtue of the definition of labelled objects) by the policy manager. Likewise, the policy manager can be readily customized to implement any desired policy including hybrids of MAC, DAC and role-based policies which can thus reconcile mutual exclusivity between such policies and provide for modification of security policies.

While the invention has been described in terms of a single preferred embodiment, those skilled in the art will recognize that the invention can be practiced with modification within the spirit and scope of the appended claims.

Having thus described my invention, what I claim as new and desire to secure by letters patent is as follows:

1. A data processing system including an access control system for controlling access to portions of a resource and capable of running an application, said access control system including a trusted framework including a credential class and a label class of objects, and a policy manager including a policy manager class of objects including means for creating label objects for portions of said resource and credential objects corresponding to users of said data processing system and instantiating said label objects and said credential objects in a respective one of said label class and said credential class, and p1 means for comparing a credential object created by said policy manager with a label object created by said policy manager for operation of said access control system.

2. A data processing system as recited in claim 1, wherein said policy manager includes a plurality of said policy manager classes of objects.

3. A data processing system as recited in claim 1, wherein said policy manager class implements a mandatory access control policy.

4. A data processing system as recited in claim 3, wherein said mandatory access control policy is a role-based access policy.

5. A data processing system as recited in claim 3, wherein said mandatory access control policy is a classification-based policy.

6. A data processing system as recited in claim 1, wherein said policy manager class implements a discretionary access control policy.

* * * * *